US009228472B2

(12) United States Patent
Greiner et al.

(10) Patent No.: US 9,228,472 B2
(45) Date of Patent: Jan. 5, 2016

(54) SYSTEM FOR THERMAL MANAGEMENT OF A VEHICLE AND METHOD FOR VEHICLE COLD START

(71) Applicant: Ford Global Technologies, LLC, Dearborn, MI (US)

(72) Inventors: Christopher Mark Greiner, Birmingham, MI (US); Poyu Tsou, Canton, MI (US); Kai Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 13/922,069

(22) Filed: Jun. 19, 2013

(65) Prior Publication Data

US 2014/0374058 A1    Dec. 25, 2014

(51) Int. Cl.
*F01P 11/20* (2006.01)
*F01N 5/02* (2006.01)
*B60H 1/00* (2006.01)
*F02N 19/10* (2010.01)
*F28D 20/02* (2006.01)

(52) U.S. Cl.
CPC .............. *F01N 5/02* (2013.01); *B60H 1/00492* (2013.01); *F02N 19/10* (2013.01); *F28D 20/02* (2013.01); *F01P 2011/205* (2013.01); *F01P 2037/02* (2013.01)

(58) Field of Classification Search
CPC ............. F01N 5/02; F01N 19/10; F01P 11/20
USPC ............ 123/41.14, 142.5 R, 142.5 E; 60/284, 60/286, 320
See application file for complete search history.

(56) References Cited

U.S. PATENT DOCUMENTS 6,374,613 B1 * 4/2002 Filippone .................... 60/608
6,520,136 B2    2/2003 Ito et al.
(Continued)

FOREIGN PATENT DOCUMENTS

FR    2823704 A1    10/2002
JP    H1071837 A    3/1998
JP    H1077834 A    3/1998

OTHER PUBLICATIONS

Ukraincyzk, N. et al., "Thermophysical Comparison of Five Commercial Paraffin Waxes as Latent Heat Storage Materials," Chemical & Biochemical Engineering Quarterly, pp. 129-137, vol. 24 No. 2 Jul. 2010, 9 pages.

(Continued)

*Primary Examiner* — Hai Huynh
(74) *Attorney, Agent, or Firm* — Julia Voutyras; Alleman Hall McCoy Russell & Tuttle LLP

(57) ABSTRACT

A method, comprising during a vehicle engine cold start, opening a first valve coupled between a first container containing an adsorbent and a second container containing an adsorbate, circulating a first fluid through a first conduit coupled to a first heat exchanger located within the first container and a second heat exchanger located outside the first container, and circulating a second fluid through a second conduit coupled to the second heat exchanger. In this way, heat may be generated at the adsorber during a cold start and subsequently transferred to the cooling jacket of the vehicle engine and/or other vehicle compartments, thereby decreasing the warm-up time for the engine.

19 Claims, 5 Drawing Sheets

(56) References Cited

U.S. PATENT DOCUMENTS

| | | | |
|---|---|---|---|
| 6,807,820 B2 * | 10/2004 | Aikawa et al. | 62/238.3 |
| 8,333,079 B2 | 12/2012 | Kakiuchi et al. | |
| 2004/0154784 A1 | 8/2004 | Pause | |
| 2007/0004591 A1 | 1/2007 | Itabashi et al. | |
| 2009/0236435 A1 | 9/2009 | Kudo et al. | |
| 2010/0192602 A1 | 8/2010 | Brooks et al. | |
| 2011/0067389 A1 * | 3/2011 | Prior et al. | 60/320 |
| 2014/0047853 A1 * | 2/2014 | Zhong et al. | 62/106 |

OTHER PUBLICATIONS

Abdullah, Mohammad Omar, et al., "Automobile Adsorption Air-Conditioning System Using Oil Palm Biomass-based Activated Carbon: A Review," Renewable and Sustainable Energy Reviews, pp. 2061-2072, vol. 15, 2011, 12 pages.

* cited by examiner

SYSTEM FOR THERMAL MANAGEMENT OF A VEHICLE AND METHOD FOR VEHICLE COLD START

BACKGROUND AND SUMMARY

As internal combustion engines become more fuel efficient, less waste heat is produced, and consequently, the time taken to reach an optimum running temperature increases. This delay in reaching operating temperature may depress fuel economy, increase engine wear and increase exhaust emissions. Additionally, heating systems employed to warm the passenger compartment typically rely on a heater core which is coupled to the coolant jacket of the engine. An increase in engine warm-up time will further result in a delay in warming the passenger compartment, particularly during a cold-start condition.

To enhance engine warm-up conditions, thermal energy storage devices have been developed to store a gas or liquid medium at high operating temperatures. The most common approach has been to employ a phase change material (PCM) that has been exposed to a solid-liquid or liquid-gas change and heat of fusion to optimize the latent heat storage. However, common PCMs may be corrosive to metal, flammable, have low volumetric energy density, may require additional insulation for storage, and the amount of heat stored in the PCM may degrade over time. Hybrid-electric vehicles (HEVs), Plug-in Hybrid Electric Vehicles (PHEVs) and Electric Vehicles (EVs) commonly employ positive thermal coefficient (PTC) heaters and/or fuel fired heaters. Using these systems to warm a passenger compartment may result in large amounts of fuel or electricity diverted from power propulsion systems. Draining the fuel or battery in this manner may severely restrict the driving range of the vehicle.

An example of a heat storage and warm-up control device is shown in U.S. Pat. No. 6,520,136, in which coolant is stored in a heat insulating container as a heat storage device. The coolant may be used to warm an internal combustion engine after passing through an intake air heat exchanger, a heat exchanger for lubricating oil, and a heat exchanger for automatic transmission hydraulic fluid. Japanese patent application 10-77834 discloses a system where coolant stored in a heat storage device may be used for heating engine intake air, engine oil, and automatic transmission fluid. US 2004/0154784 discloses a method for using phase change materials such as paraffin wax in the interior of an vehicle to conserve energy while providing heat to the passenger compartment. However, these systems and methods have similar disadvantages, in that the materials used have low energy density, are highly flammable and prone to losing stored energy over time.

The inventors herein have identified the above issues, as well as systems and methods for a thermal management for a vehicle including an adsorption thermal storage device that allows a high-energy density adsorbent to be used to generate heat for warming the vehicle engine, the passenger compartment, and/or other vehicle elements requiring heat. In one example, a method comprises: during a vehicle engine cold start, opening a first valve coupled between a first container containing an adsorbent and a second container containing an adsorbate, circulating a first fluid through a first conduit coupled to a first heat exchanger located within the first container and a second heat exchanger located outside the first container, and circulating a second fluid through a second conduit coupled to the second heat exchanger. The second conduit may be further coupled to the cooling jacket of a vehicle engine. In this way, heat may be generated at the adsorber during a cold start, such as an engine start with the engine cooled to ambient temperatures, and subsequently transferred to the cooling jacket of the vehicle engine and/or other vehicle compartments, thereby decreasing the warm-up time for the engine or other components.

In another example, a thermal management system for a vehicle, comprises an adsorption thermal storage device comprising a first container including an adsorbent coupled via a first valve to a second container including an adsorbate, a first heat exchanger coupled to the first container and further coupled to a first coolant circuit including a first coolant, and a second heat exchanger coupled to the first coolant circuit and further coupled to a second coolant circuit including a second coolant, a first warming target coupled to the second coolant circuit. In this way, thermal energy may be stored as chemical potential which will not degrade with time. The energy may be accessed by combining the adsorbent with the adsorbate, in this example by opening a valve separating two containers. This system allows heat to be generated without any additional load on the engine, and minimal load on the vehicle battery.

In yet another example, a warm-up system for a vehicle engine, comprises an adsorption thermal storage device comprising an adsorber containing an adsorbent coupled via a valve to a fluid tank containing an adsorbate, a first conduit containing a first coolant, the first conduit coupled to a first heat exchanger located within the adsorber and a second heat exchanger located outside the adsorber, a second conduit containing a second coolant, the second conduit coupled to the second heat exchanger and further coupled to a cooling jacket of the vehicle engine, and a controller configured with instructions stored in memory for: in response to a cold start event, opening the first valve, circulating the first fluid through the first coolant circuit, and circulating the second coolant through the second coolant circuit. In this way, it is possible to utilize an adsorbent and adsorbate to generate heat, high energy density materials such as zeolite may be used to generate a large amount of heat with a small engine compartment footprint, and without resorting to corrosive or flammable materials.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically shows a motor vehicle incorporating the thermal management system described herein.

FIG. 2 schematically shows the thermal management system of FIG. 1.

DETAILED DESCRIPTION

Figure 1:
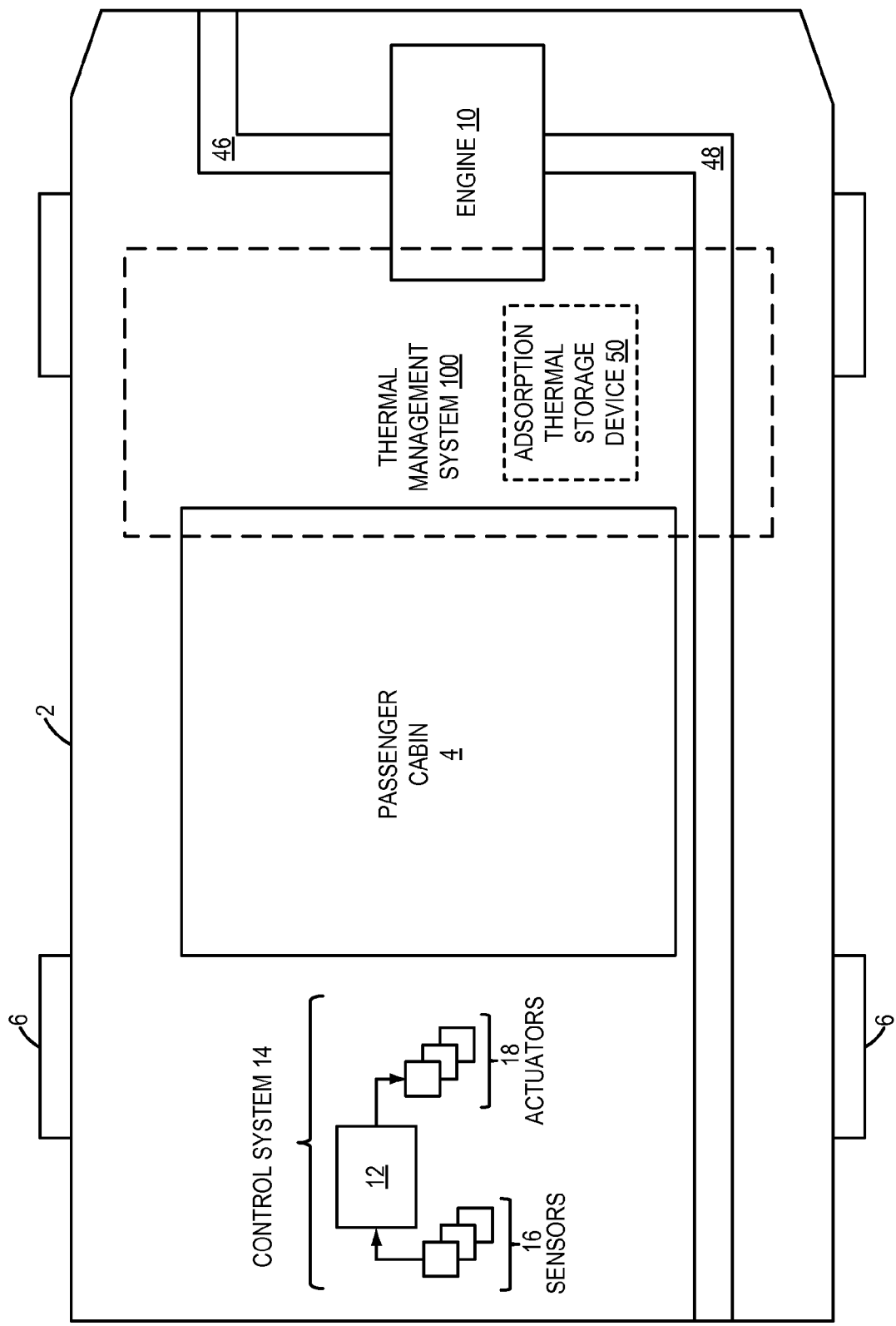
Figure 2:
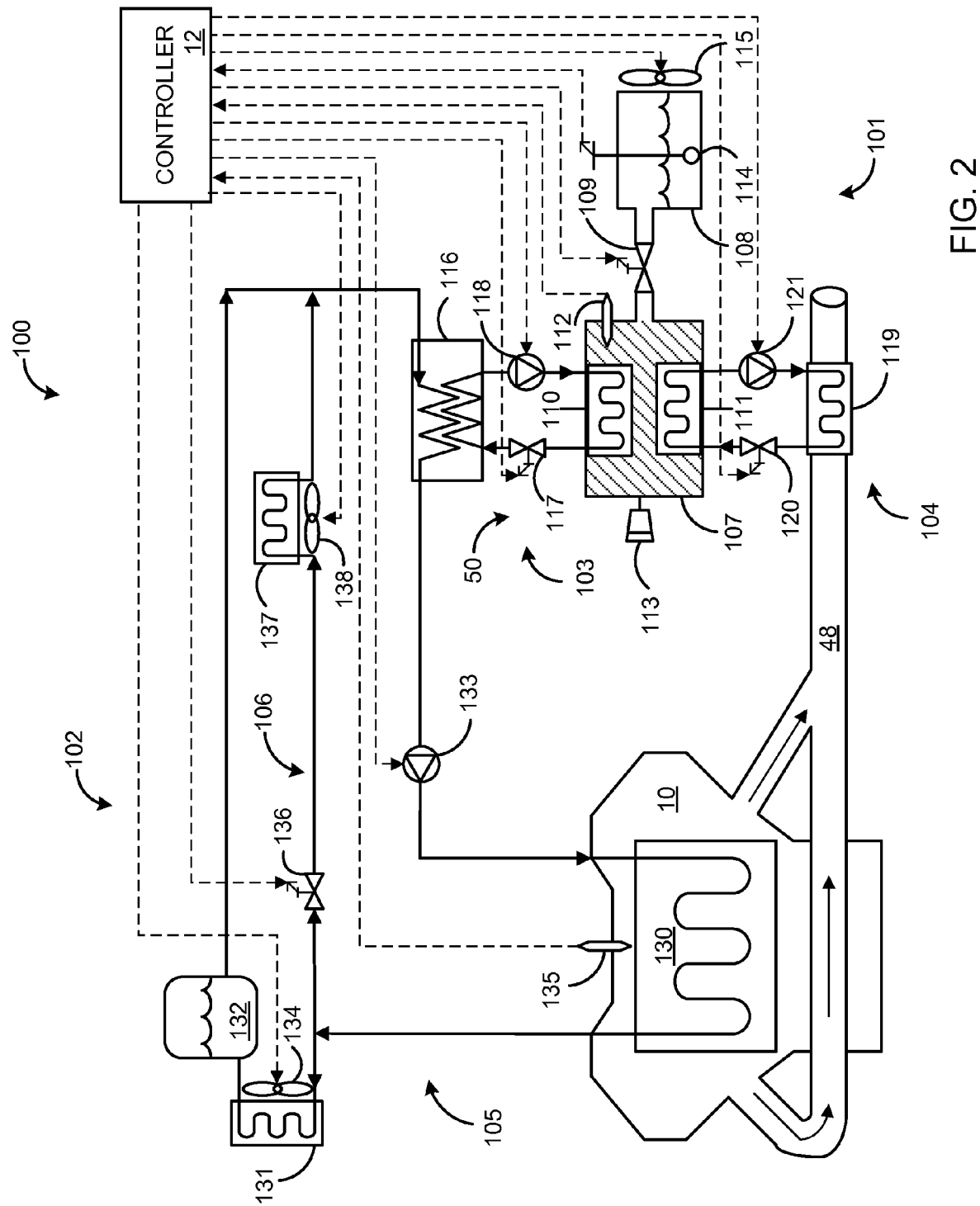
Figure 3:
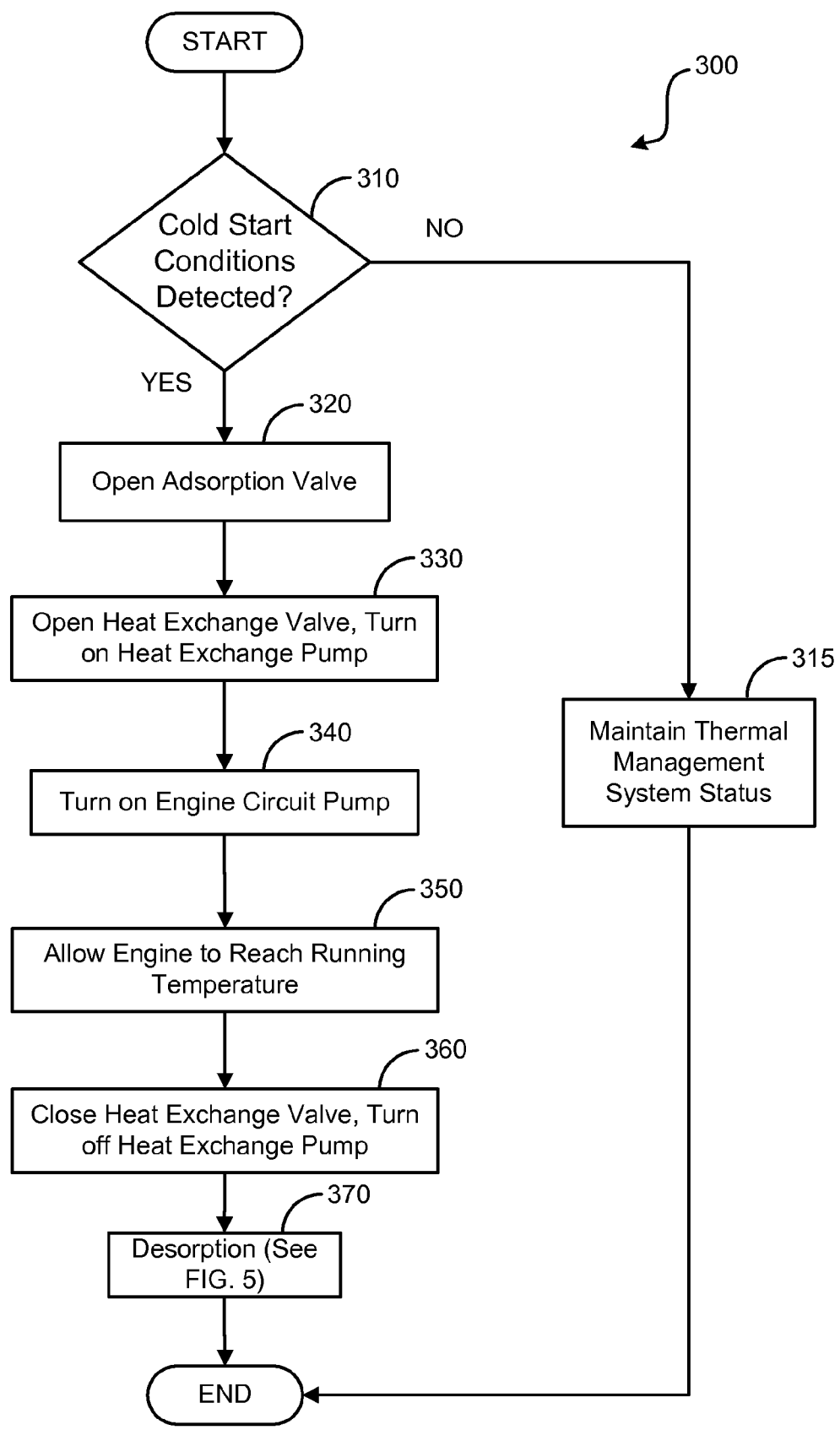
FIG. 3 depicts an example method for operating the thermal management system of FIG. 2 during a cold-start routine.
Figure 4:
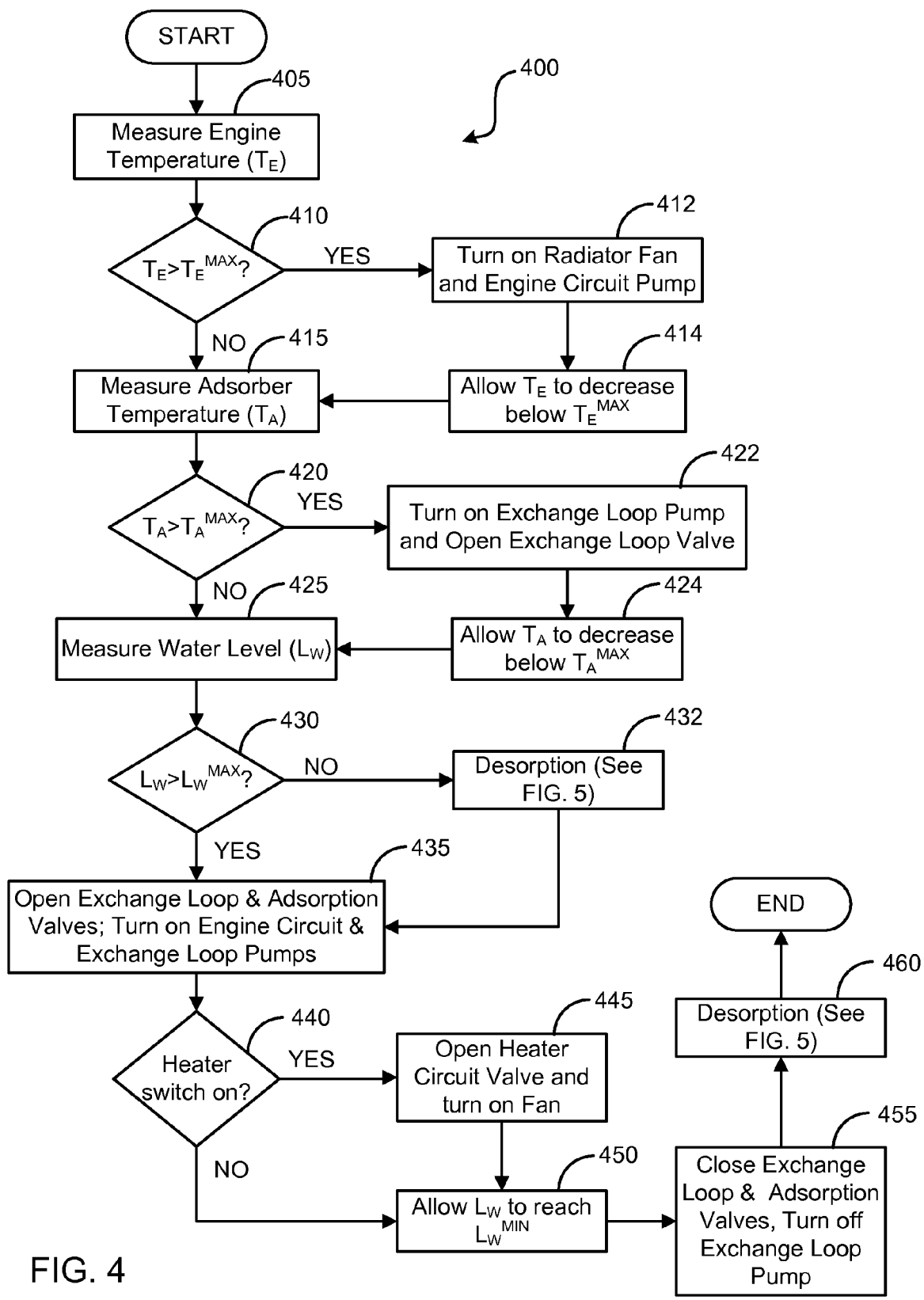
FIG. 4 depicts an example method for operating the thermal management system of FIG. 2 during typical engine operating conditions.
Figure 5:
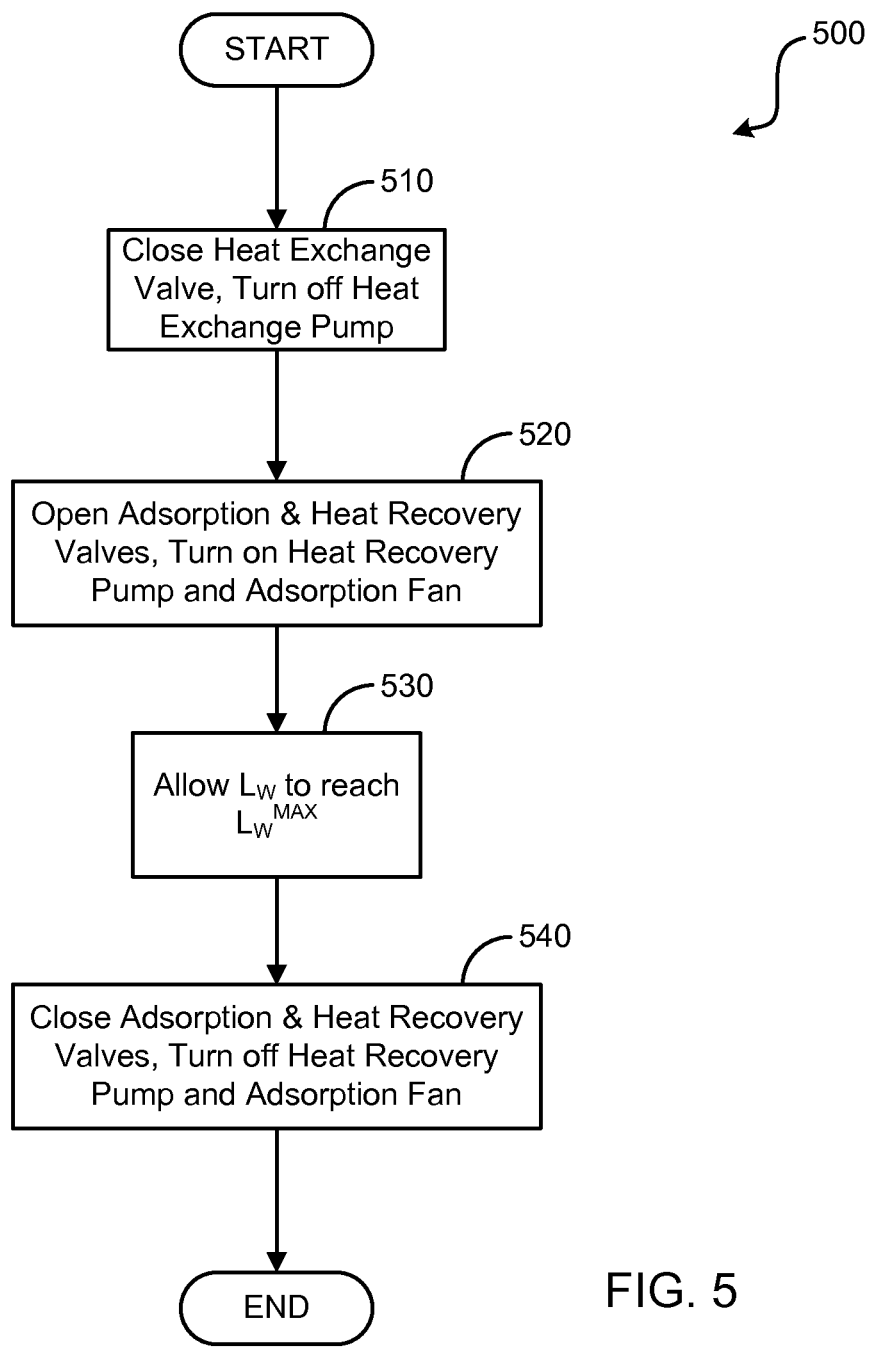
FIG. 5 depicts an example method for desorption using the thermal management system of FIG. 2.

The following description relates to systems and methods for managing the temperature of a motor vehicle engine and the passenger cabin of the motor vehicle utilizing a thermal management system including an adsorption thermal storage device that stores thermal energy as chemical potential. FIG. 1 shows an example embodiment of a motor vehicle including a thermal management system that may be coupled to the motor vehicle engine, exhaust passage and passenger cabin to manage the heating and cooling of the engine and passenger compartment. FIG. 2 shows a more detailed schematic of the thermal management system, including an adsorption thermal storage device coupled to an adsorber circuit and a coolant circuit. As shown in FIG. 3, the thermal management system may be utilized to enable a method to warm an engine during a cold-start condition. FIG. 4 depicts a high-level flow chart for managing engine and passenger compartment temperatures using the thermal management system. FIG. 5 depicts a method for desorption, whereby the chemical potential of the adsorption thermal storage device is restored by driving desorption with heat from engine cylinder exhaust.

FIG. 1 shows an example embodiment of a motor vehicle 2 including a thermal management system 100 in accordance with the present disclosure. Vehicle 2 includes drive wheels 6, a passenger cabin 4, and an internal combustion engine 10. Internal combustion engine 10 includes at least one combustion chamber (not shown) which may receive intake air via an intake passage 46 and may exhaust combustion gases via exhaust passage 48. Engine 10 may be included in a motor vehicle such as a road automobile, among other types of vehicles. In some embodiments, engine 10 may be included in a propulsion system that also includes a battery driven electric motor, such as in a Hybrid Electric Vehicle (HEV) or a Plug-in Hybrid Electric Vehicle (PHEV). In some embodiments, thermal management system 100 may be included in an Electric Vehicle (EV) where engine 10 is omitted.

Thermal management system 100 may include an adsorption thermal storage device 50 or thermal battery. One such embodiment is shown in FIG. 2 and described in detail below. As shown in FIGS. 1 and 2, thermal management system 100 may be coupled to engine 10, exhaust passage 48 and passenger cabin 4. The adsorption thermal storage device may be configured to use reversible exothermic and endothermic reactions to generate heat, store thermal energy or absorb heat. The reversible reactions may be used, for example, to provide heat to engine 10 at cold start, to warm passenger cabin 4 in response to a passenger request to heat the cabin, or to absorb excess heat from engine 10 and/or exhaust passage 48. In this way, engine 10 may be largely freed from providing climate control in the vehicle, and thermal management system 100 may not exert a load on engine 10.

FIG. 1 further shows a control system 14 of vehicle 2. Control system 14 may be communicatively coupled to various components of engine 10 and thermal management system 100 to carry out the control routines and actions described herein. As shown in FIG. 1, control system 14 may include an electronic digital controller 12. Controller 12 may be a microcomputer, including a microprocessor unit, input/output ports, an electronic storage medium for executable programs and calibration values, random access memory, keep alive memory, and a data bus.

As depicted, controller 12 may receive input from a plurality of sensors 16, which may include user inputs and/or sensors (such as transmission gear position, transmission clutch position, gas pedal input, brake input, transmission selector position, vehicle speed, engine speed, mass airflow through the engine, ambient temperature, intake air temperature, etc.), climate control system sensors (such as HTF temperature, antifreeze temperature, adsorbent temperature, fan speed, passenger compartment temperature, desired passenger compartment temperature, ambient humidity, etc.), and others.

Further, controller 12 may communicate with various actuators 18, which may include engine actuators (such as fuel injectors, an electronically controlled intake air throttle plate, spark plugs, transmission clutches, etc.), thermal management system actuators (such as air handling vents and/or diverter valves, valves controlling the flow of HTF, valves controlling flow of refrigerant, blower actuators, fan actuators, pump actuators, etc.), and others. In some examples, the storage medium may be programmed with computer readable data representing instructions executable by the processor for performing the methods described below as well as other variants that are anticipated but not specifically listed.

FIG. 2 depicts a schematic diagram of an embodiment of thermal management system 100. Thermal management system 100 comprises two circuits, adsorber circuit 101 and coolant circuit 102. Adsorber circuit 101 includes adsorption thermal storage device 50, coolant/adsorber heat exchange loop 103 and heat recovery loop 104. Coolant circuit 102 includes engine circuit 105 and heater circuit 106.

Adsorber circuit 101 may employ adsorption thermal storage device 50 to generate thermal energy through chemical adsorption. This thermal energy may be transferred to engine coolant via coolant/adsorber heat exchange loop 103. Adsorption thermal storage device 50 may include adsorber 107, which may be filled with an adsorbent. The adsorbent may be a high energy medium density such as silica gel, zeolite, activated carbon, or other suitable adsorbents. The adsorbent may be formed into a crystalline structure within adsorber 107. Adsorber 7 may be coupled to fluid container 108 via electronic throttling valve 109. Electronic throttling valve 109 may be opened or closed in response to signals from controller 12. Fluid container 108 may contain an adsorbate that results in an exothermic reaction when combined with the adsorbent in adsorber 7. For example, in embodiments where the adsorber contains an adsorber such as zeolite, the fluid in fluid container 108 may be water, or an aqueous solution, such as ethylene glycol solution or propylene glycol solution. The fluid may also be a methanol or ammonia based solution. Upon opening of electronic throttling valve 109, fluid from fluid container 108 may enter adsorber 107, where the fluid may be adsorbed by the adsorbent.

Adsorber 107 may further contain heat exchangers 110 and 111, which may be coupled to coolant/adsorber heat exchange loop 103 and heat recovery loop 104, respectively. Adsorber 107 may include a temperature sensor, such as thermocouple 112, and may further include pressure relief valve 113. Fluid container 108 may further include fluid level sensor 114, and may be coupled to fan 115.

Coolant/adsorber heat exchange loop 103 includes heat exchangers 110 and 116, valve 117 and pump 118. Valve 117 and pump 118 may be controlled by signals from controller 12. Pump 118 may be a variable speed pump, with the pump speed determined at controller 12. By opening valve 117 and activating pump 118, fluid in coolant/adsorber heat exchange loop 103 may be circulated freely between heat exchanger 110 and heat exchanger 116. In this way, thermal energy produced through adsorption in adsorber 107 may be transferred to coolant circuit 102. Heat exchangers 110 and 116 may be decoupled by closing valve 117 and shutting off pump 118.

Heat recovery loop 104 includes heat exchangers 111 and 119, valve 120 and pump 121. Valve 120 and pump 121 may be controlled by signals from controller 12. By opening valve 120 and activating pump 121, fluid in heat recovery loop 104 may be circulated freely between heat exchanger 111 and heat exchanger 119. In this way, thermal energy in exhaust passing through exhaust passage 48 may be transferred to adsorber 107. This thermal energy may be used to stimulate desorption of fluid from the adsorbent. The fluid may then condense and accumulate in fluid container 108, thereby restoring the thermal potential of adsorption thermal storage device 50. Heat exchangers 111 and 119 may be decoupled by closing valve 120 and shutting off pump 121.

Engine circuit 105 includes heat exchanger 116, engine cooling jacket 130, radiator 131, coolant reservoir 132 and pump 133. Pump 133 may be controlled by signals from controller 12. Radiator fan 134 may be coupled to radiator 131. A temperature sensor may be coupled to engine 10 or engine cooling jacket 130, such as thermocouple 135. In a scenario when the engine is cold (e.g. cold-start conditions), heat stored in adsorber 107 may be transferred to coolant engine circuit 105 via heat exchanger 116 through activation of pumps 118 and 133 and the opening of valve 117. If the engine is overheated, coolant may be circulated by pump 133 through engine cooling jacket 130, with excess heat discharged through radiator 131 with the use of radiator fan 134. Excess heat in adsorber 107 may be dissipated through heat exchange at heat exchanger 116 through activation of pumps 118 and 133 and the opening of valve 117, with the coolant discharging excess heat through radiator 131. Heat from engine 10 may also be used to stimulate desorption at adsorber 107 through activation of pumps 118 and 133 and the opening of valve 117, in a method similar to that described above for stimulating desorption through the use of heat recovery loop 104.

Heating circuit 106 includes valve 136 and heater core 137. A fan 138 may be coupled to heater core 137. A passenger may request heat for passenger cabin 4. In response to this request, controller 12 may signal valve 136 to open, thereby partially bypassing engine circuit 105. Coolant in engine circuit 105 may be circulated through heater loop 106 by activating pump 133. Heat from the coolant may then be transferred to heater core 137 and blown into passenger cabin 4 by activating fan 138. If the coolant in engine circuit 105 is insufficient to charge heater core 137, additional heat may be passed to coolant circuit 102 from adsorber 107 by opening valve 117 and activating pump 118. More detailed methods for usage and control of thermal management system 100 are discussed below and with regards to FIGS. 3, 4 and 5.

Among the advantages of using a high energy density absorbent such as zeolite in adsorber 107, as opposed to a phase-change medium such as paraffin wax, is that a relatively small mass of zeolite may be used to generate heat, allowing for adsorber 107 to have a minimal footprint in the engine compartment of a vehicle. For example, the amount of heat necessary to warm an example 1.6 liter internal combustion engine from −6.6° C. to 60° C. may be calculated with the following equation:

$$Q = m \times C_p \times \Delta T$$

Where m (mass) is 114 kg, $C_p$ (specific heat) is 0.45 kJ/kg×° K and $\Delta T$ (temperature change)=−66.6° K. Q (heat energy) is thus −3416.58 kJ. Paraffin wax has a heat of fusion ($\Delta H_{pw}$) of 184.48 kJ/kg, and thus 18.5 kg of paraffin is needed to warm this example engine. With a density ($\rho_{pw}$) of 775 kg/m3, 23.8 L of paraffin wax would have to be stored in an adsorber in order to generate 3416.58 kJ of thermal energy.

In contrast, the heat of adsorption ($\Delta H_{zw}$) of zeolite/water is 3300 kJ/kg. To warm the example engine, 1.04 kg of zeolite and 0.47 kg of water would be needed. This equates to 1.39 L of zeolite and 0.47 L of water, or 1.86 L total volume in order to generate 3416.58 kJ of thermal energy. The true volume of the adsorbent and adsorbate tanks may be slightly larger to accommodate greater demands for heat, or to store water as a glycol-aqueous solution in order to prevent freezing. In addition to the space savings, zeolite/water is less flammable than paraffin wax, and because the energy is stored as chemical potential, the stored energy does not degrade over time.

FIG. 3 shows an example method 300 for operating internal combustion engine 10 as depicted in FIGS. 1 and 2. Method 300 may be configured as computer instructions stored by a control system and implemented by a controller, for example controller 12 as shown in FIGS. 1 and 2. FIG. 3 will be described in reference to components and features of the example engines detailed in FIGS. 1 and 2, but it should be recognized that method 300 or other equivalent methods may be performed with respect to a plurality of engine configurations without departing from the scope of this disclosure.

Method 300 may begin at 310 by determining whether cold start conditions are detected. The detection of cold start conditions may include the detection of a key-on event and an assessment of engine temperature and/or the length of time that has passed since the most recent engine-off event. Method 300 may be triggered to begin at a key-on event, or may be performed periodically. If no cold-start condition is detected, method 300 may proceed to 315. At 315, method 300 may include maintaining the current status of the thermal management system.

If a cold start condition is detected, method 300 may proceed to 320. At 320, method 300 may include opening an adsorption valve. In the example system shown in FIG. 2, the adsorption valve is valve 109, but may be any valve coupled between a container containing an adsorbate and a container containing an adsorbent. In the example system shown in FIG. 2, adsorption valve 109 is an electronic throttling valve. As such, the valve may be open at 100% duty cycle, or may be open at a lower duty cycle, for example 50%. Controller 12 may open valve 109 at a duty cycle that is a function of the amount of heat necessary to warm the engine to operating temperature, which may be a predetermined duty cycle, or may be calculated based on the current engine temperature, current ambient temperature, or other engine operating conditions. By opening valve 109, water from container 108 is adsorbed by the adsorbent located in adsorber 107. In embodiments where the water in container 108 is in the form of a glycol-aqueous solution, the concentration of the glycol in solution will increase, altering the freezing point of the solution remaining in the container.

At 330, method 300 may include opening a heat exchange valve and turning on a heat exchange pump. Referring to the example system shown in FIG. 2, this would entail opening valve 117 and turning on pump 118, but may involve any means of circulating coolant through the coolant/adsorber heat exchange loop. In this way, pump 118 facilitates the transfer of heat from the adsorber to the coolant/adsorber hear exchange loop. In some embodiments, pump 118 may be a variable speed pump. Controller may operate pump 118 at a pre-determined speed, or at a speed that is a function of engine operating conditions.

At 340, method 300 may include turning on an engine circuit pump. Referring to the example system shown in FIG. 2, this would entail turning on pump 133, but may involve any means of circulating coolant through the engine circuit. In this way, pump 133 facilitates the transfer of heat from the coolant/adsorber hear exchange loop to the engine circuit. In some embodiments, pump 118 may be a variable speed pump. Controller 12 may operate pump 118 at a pre-determined speed, or at a speed that is a function of engine operating conditions. In some examples, coolant may also be circulated through heater circuit 106 by opening valve 136, for example, if a passenger has requested heat for the passenger cabin. In some embodiments, the opening of valve 136 may be delayed until the engine has reached a predetermined temperature.

At 350, method 300 may include allowing the engine to reach running temperature. The running temperature may be predetermined, or may be a function of current operating conditions. The engine temperature may be evaluated through repeated measurements by an engine temperature sensor, such as thermocouple 135. In some examples, the running temperature may be evaluated after a pre-determined period of time. In some examples, allowing the engine to reach running temperature may include allowing coolant to circulate for a pre-determined amount of time. The amount of time needed for the engine to reach running temperature may be increased if heater circuit 106 is activated, and may be decreased if ambient temperatures are relatively high.

At 360, method 300 may include closing a heat exchange valve and turning off a heat exchange pump. Referring to the example system shown in FIG. 2, this would entail closing valve 117 and turning off pump 118, but may involve any means of preventing the circulation of coolant through the coolant/adsorber heat exchange loop. In this way, the coolant/adsorber heat exchange loop is decoupled from the adsorber and the coolant circuit. Coolant may continue to be circulated through the coolant circuit, but the speed of pump 133 may be increased or decreased based on engine operating conditions.

At 370, method 300 may include switching adsorber 107 to a desorption mode, whereby fluid is desorbed from the adsorbent and the adsorption potential of the adsorbent is restored. This process is discussed in more detail below and with regard to FIG. 5. Following desorption, method 300 may end.

The system of FIG. 2 and high-level method of FIG. 3 may be utilized to enact one or more methods. In one example, a method comprising, during a vehicle engine cold start opening a first valve coupled between a first container containing an adsorbent and a second container containing an adsorbate, circulating a first fluid through a first conduit coupled to a first heat exchanger located within the first container and a second heat exchanger located outside the first container, and circulating a second fluid through a second conduit coupled to the second heat exchanger. Opening the valve coupled between the first and second containers may result in adsorbate from the second container entering the first container. The second conduit may be further coupled to the cooling jacket of a vehicle engine. The method may further comprise allowing the vehicle engine to reach a predetermined running temperature, and stopping circulation of the first fluid through the first conduit. The method may further comprise circulating a third fluid through a third conduit, the third conduit coupled to a third heat exchanger coupled to the first container and further coupled to a fourth heat exchanger coupled to a waste heat source, activating a fan coupled to the second container, allowing the adsorbate in the second container to reach a predetermined threshold level, closing the first valve, stopping circulation of the third fluid, and de-activating the fan coupled to the second container. The waste heat source may be an exhaust passage coupled to the vehicle engine. In some embodiments, the adsorbent is zeolite and the adsorbate is an aqueous solution, such as water, or a water/glycol solution. The second conduit may be further coupled to a radiator and a third container containing the second fluid. The second conduit may be further coupled to a fourth conduit, the fourth conduit coupled to a heater core used for warming a passenger cabin of the vehicle.

The technical result of this method is a cold-start routine that allows for the engine to be warmed through heat generated through an exothermic adsorption reaction. Additional heat may be diverted to other vehicle compartments without exerting additional load on the engine, such as a heater core for the passenger compartment. The chemical potential of the adsorbent may be restored by using waste heat to evaporate the adsorbate and return the adsorbate to the second fluid container. In this way, no thermal energy is lost over time during storage.

FIG. 4 shows an example method 400 for operating internal combustion engine 10 as depicted in FIGS. 1 and 2. Method 400 may be configured as computer instructions stored by a control system and implemented by a controller, for example controller 12 as shown in FIGS. 1 and 2. FIG. 4 will be described in reference to components and features of the example engines detailed in FIGS. 1 and 2, but it should be recognized that method 400 or other equivalent methods may be performed with respect to a plurality of engine configurations without departing from the scope of this disclosure. Method 400 may be considered a method for the adsorption mode of an adsorption thermal storage device.

Method 400 may begin at 405 by measuring or estimating engine temperature. Engine temperature may be gauged at controller 12 based on readings from an engine temperature sensor, such as thermocouple 135 as depicted in FIG. 2. At 410, method 400 may include comparing the current engine temperature ($T_E$) to threshold maximum engine temperature ($T_E^{MAX}$). $T_E^{MAX}$ may be a predetermined value, or may be determined as a function of engine operating conditions. If $T_E$ is greater than $T_E^{MAX}$, method 400 may proceed to 412. If $T_E$ is less than $T_E^{MAX}$, method 400 may proceed to 415.

At 412, if the engine has been determined to be overheated ($T_E > T_E^{MAX}$), method 400 may include turning on a radiator fan and an engine circuit pump. Referring to the example system of FIG. 2, this includes radiator fan 134 and engine circuit pump 133. In this way, coolant may be circulated through the engine circuit. Excess engine heat may be transferred to the coolant via engine cooling jacket 130, and further transferred to radiator 131, where it may be dissipated via fan 134. At 414, method 400 may include allowing $T_E$ to decrease below $T_E^{MAX}$. This may be based on readings from an engine temperature sensor, such as thermocouple 135 as depicted in FIG. 2. When $T_E$ has decreased below $T_E^{MAX}$, the radiator fan and engine circuit pump may be turned off, and method 400 may proceed to 415.

At 415, method 400 may include measuring the temperature of the adsorber. The temperature of adsorber 107 may be gauged at controller 12 based on readings from an adsorber temperature sensor, such as thermocouple 112 as depicted in FIG. 2. At 420, method 400 may include comparing the current adsorber temperature ($T_A$) to a threshold maximum adsorber temperature ($T_A^{MAX}$). $T_A^{MAX}$ may be a predetermined value, or may be determined as a function of engine operating conditions. If $T_A$ is greater than $T_A^{MAX}$, method 400 may proceed to 422. If $T_A$ is less than $T_A^{MAX}$, method 400 may proceed to 425.

At 422, if the adsorber has been determined to be overheated ($T_A > T_A^{MAX}$), method 400 may include opening an exchange loop valve and turning on an exchange loop pump. Referring to the example system of FIG. 2, this includes exchange loop valve 117 and exchange loop pump 118. In this way, coolant may be circulated through the coolant/adsorber heat exchange loop. Excess adsorber heat may be transferred to coolant in engine circuit 105 via heat exchanger 116. If the engine circuit pump 133 is not on, it may be activated at this time. Heat transferred to coolant in engine circuit 105 may be dissipated at radiator 131, and may require activation of radiator fan 134. Heat may also be transferred to heater circuit 106 and stored at heater core 137 if heater circuit valve 136 is opened. At 424, method 400 may include allowing $T_A$ to decrease below $T_A^{MAX}$. This may be based on readings from an adsorber temperature sensor, such as thermocouple 112 as depicted in FIG. 2. When $T_A$ has decreased below $T_A^{MAX}$, the exchange loop valve may be closed and the exchange loop pump may be turned off. Other components activated to dissipate adsorber heat may also be deactivated. Method 400 may then proceed to 425.

At 425, method 400 may include measuring the level of water in fluid container 108. Referring to the example system depicted in FIG. 2, $L_w$ may be determined through repeated measurements by water level sensor 114. At 430, method 400 may include comparing $L_w$ to a predetermined threshold maximum water level, $L_w^{MAX}$. If $L_w$ is greater than $L_w^{MAX}$, method 400 may proceed to 435. If $L_w$ is less than $L_w^{MAX}$, method 400 may proceed to 432. At 432, method 400 may include switching adsorber 107 to a desorption mode, whereby fluid is desorbed from the adsorbent and the adsorption potential of the adsorbent is restored. This process is discussed in more detail below and with regard to FIG. 5. Following desorption, method 400 may proceed to 435.

At 435, method 400 may include opening exchange loop and adsorption valves, and turning on engine circuit and exchange loop pumps. Referring to the example system depicted in FIG. 2, this includes exchange loop valve 120, adsorption valve 109, engine circuit pump 133 and exchange loop pump 118. In this way, fluid in fluid container 108 may enter adsorber 107 and generate heat through the exergonic adsorption reaction that follows. The heat may be transferred to the coolant/adsorber heat exchange loop 103 via heat exchanger 110, and further transferred to engine circuit 105 via heat exchanger 116. The adsorption valve may be opened at 100% duty cycle, or at a duty cycle determined by the controller as a function of thermal energy needed. Similarly, the speed of exchange loop pump 118 may be determined as a function of engine operating conditions. Method 400 may then proceed to 440.

At 440, method 400 may include determining whether a heater switch is on. Determining whether a heater switch is on may include controller 12 detecting if heat has been requested in the passenger cabin. If the heater switch is not on, method 400 may proceed to 450. If the heater switch is on, method 400 may proceed to 445. At 445, method 400 may include opening the heater circuit valve and turning on the heater fan. Referring to the example system depicted in FIG. 2, this includes heater circuit valve 136 and heater fan 138. By opening heater circuit valve 136, coolant may circulate through heater circuit 106, and may be stored in heater core 137. Heater fan 138 may dissipate heat from heater core 137 by blowing air into the passenger compartment of the vehicle.

At 450, method 400 may include allowing water level $L_w$ to reach a minimum threshold level $L_w^{MIN}$. Referring to the example system depicted in FIG. 2, $L_w$ may be determined through repeated measurements by water level sensor 114. In this way, the maximum amount of water in fluid container 108 may be adsorbed by adsorber 107.

At 455, method 400 may include closing exchange loop and adsorption valves, and turning off the exchange loop pump. Referring to the example system depicted in FIG. 2, this includes exchange loop valve 120, adsorption valve 109 and exchange loop pump 118. In this way, adsorber 107 is decoupled from fluid container 108, and fluid no longer circulates through coolant/adsorber heat exchange loop 103, decoupling adsorber 107 from coolant circuit 102.

At 460, method 400 may include switching adsorber 107 to a desorption mode, whereby fluid is desorbed from the adsorbent and the adsorption potential of the adsorbent is restored. This process is discussed in more detail below and with regard to FIG. 5. Following desorption, method 400 may end.

The system of FIG. 2 and method of FIG. 4 may enable one or more systems for thermal management. In one example, a thermal management system for a vehicle, comprising: an adsorption thermal storage device comprising a first container including an adsorbent coupled via a first valve to a second container including an adsorbate, a first heat exchanger coupled to the first container and further coupled to a first coolant circuit including a first coolant, a second heat exchanger coupled to the first coolant circuit and further coupled to a second coolant circuit including a second coolant, and a first warming target coupled to the second coolant circuit. The system may further comprise a third heat exchanger coupled to the first container and further coupled to a third coolant circuit including a third coolant, and a fourth heat exchanger coupled to the third coolant circuit and further coupled to a waste heat source. The second conduit may be coupled to a second warming target and further coupled to a third container including the second coolant. The system may further comprise a fourth coolant circuit containing the second coolant and coupled to the second coolant circuit via a second valve, and a third warming target coupled to the fourth coolant circuit. The system may further comprise a controller configured with instructions stored in memory for: in response to a request for heat for the first warming target, opening the first valve, circulating the first coolant through the first coolant circuit, and circulating the second coolant through the second coolant circuit. The controller may be further configured with instructions stored in memory for: in response to a request for heat for the third warming target, opening the second valve, circulating the second coolant through the fourth coolant circuit, activating a first fan coupled to the third warming target. The controller may be further configured with instructions stored in memory for: in response to a level of adsorbate in the second container being below a first threshold, stopping circulation of the first coolant through the first coolant circuit, opening the first valve, circulating the third coolant through the third coolant circuit, activating a second fan coupled to the second container, allowing the level of adsorbate in the second container to reach a second threshold higher than the first threshold, closing the first valve, de-activating the second fan and stopping circulation of the third coolant through the third coolant circuit. The first warming target may be a cooling jacket of a vehicle engine. In some embodiments, the first warming target may a cooling jacket of a vehicle engine, the second warming target may be a radiator and the third warming target may be a heater core used for warming a passenger cabin of the vehicle. In some embodiments, the first warming target may be a heater core used for warming a passenger cabin of the vehicle. The adsorbent may be zeolite and the adsorbate may be an aqueous solution. The waste heat source may be an exhaust passage coupled to a vehicle engine, and the third coolant may be a high temperature heat transfer fluid.

The technical result of this system is a small-footprint thermal management system allowing for chemical potential to be stored and released upon engine start up, or at any point in engine operation where additional heat is required or requested. The chemical potential may be restored using waste heat, such as engine exhaust. In this way, the thermal energy is conserved and does not degrade over time. Further, an aqueous adsorbate may be used in conjunction with a crystalline adsorbent, as opposed to a corrosive or flammable phase change material. The thermal energy may further be used to warm the passenger compartment of the vehicle without putting a load on the vehicle engine.

FIG. 5 shows an example method 500 for operating internal combustion engine 10 as depicted in FIGS. 1 and 2. Method 500 may be configured as computer instructions stored by a control system and implemented by a controller, for example controller 12 as shown in FIGS. 1 and 2. FIG. 5 will be described in reference to components and features of the example engines detailed in FIGS. 1 and 2, but it should be recognized that method 500 or other equivalent methods may be performed with respect to a plurality of engine configurations without departing from the scope of this disclosure. Method 500 may be run as a sub-routine of method 300, method 400, or other method requiring the re-establishment of chemical potential through a process of desorption. Method 500 may also be run as a stand-alone routine, for example at key-off.

Method 500 may begin at 510, and may include closing a heat exchange valve and turning off a heat exchange pump. Referring to the example system shown in FIG. 2, this would entail closing valve 117 and turning off pump 118, but may involve any means of preventing the circulation of coolant through the coolant/adsorber heat exchange loop. In this way, the coolant/adsorber heat exchange loop is decoupled from the adsorber and the coolant circuit. Coolant may continue to be circulated through the coolant circuit, but the speed of pump 133 may be increased or decreased based on engine operating conditions.

At 520, method 500 may include opening the adsorption and heat recovery valves, and turning on the heat recovery pump and adsorption fan. Referring to the example system depicted in FIG. 2, this includes opening valves 109 and 120 and turning on pump 121 and fan 115. Heat recovery pump may be a variable speed pump. In such examples, the speed of the pump may be determined by controller 12 as a function of engine operating conditions, such as exhaust temperature, adsorbent temperature and fluid container level, among other conditions. Heat recovery loop 104 may include a high temperature heat transfer fluid to be circulated by pump 121. By circulating high temperature heat transfer fluid through heat recovery loop 104, thermal energy from exhaust gas in exhaust passage 48 may be transferred to adsorbent in adsorber 107 via heat exchangers 119 and 111. By increasing the temperature of the adsorbent, water will be desorbed from the adsorbent, pass through valve 109, and condense within fluid container 108. Fan 115 may act to cool fluid container 108, thus accelerating the rate of condensation. Electronic throttling valve 109 may be opened at 100% duty cycle, or opened at a lower duty cycle, for example 50%. The duty cycle used for desorption may be different from the duty cycle used for adsorption.

In some embodiments, heat may be transferred to the adsorber through other means, such as via the coolant/adsorber heat exchange loop, as opposed to the heat recovery loop. This may aid in desorption, or may be a mechanism to dissipate additional engine heat should the radiator fail or reach a maximum temperature threshold. Such a method may be in place as a backup method in case of a failure of one or more components in the heat recovery loop.

At 530, method 500 may include allowing the water level ($L_w$) in fluid container 108 to reach a predetermined threshold maximum level ($L_w^{MAX}$). Referring to the example system depicted in FIG. 2, $L_w$ may be determined through repeated measurements by water level sensor 114. When $L_w$ reaches $L_w^{MAX}$, method 500 may proceed to 540.

At 540, method 500 may include closing the adsorption and heat recovery valves, and turning off the heat recovery pump and adsorption fan. Referring to the example system depicted in FIG. 2, this includes closing valves 109 and 120 and turning off pump 121 and fan 115. In this way, desorbed water is trapped in fluid container 108, and the chemical potential of the adsorption storage device is restored. Method 500 may then end.

The systems and methods described above may enable one or more systems. In one embodiment, a warm-up system for a vehicle engine, comprising: an adsorption thermal storage device comprising an adsorber containing an adsorbent coupled via a valve to a fluid tank containing an adsorbate, a first conduit containing a first coolant, the first conduit coupled to a first heat exchanger located within the adsorber and a second heat exchanger located outside the adsorber, a second conduit containing a second coolant, the second conduit coupled to the second heat exchanger and further coupled to a cooling jacket of the vehicle engine and a controller configured with instructions stored in memory for: in response to a cold start event, opening the first valve, circulating the first fluid through the first coolant circuit, and circulating the second coolant through the second coolant circuit.

The technical result of implementing this system is a cold-start routine allowing the engine to reach running temperature rapidly, thereby decreasing emissions and engine wear, and increasing fuel economy. The adsorption thermal storage device may also be implemented in electric vehicles that do not use an internal combustion engine. In this way, the passenger compartment of the electric vehicle may be warmed without draining the vehicle battery, thereby increasing the driving range of the vehicle.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during a vehicle engine cold start:
opening a first valve coupled between a first container containing an adsorbent and a second container containing an adsorbate to flow the adsorbate from the second container to the first container for adsorption at the adsorbent;
exchanging heat between the adsorbent in the first container and a first fluid by circulating the first fluid in a coolant/adsorber heat exchange loop through a first heat exchanger located within the first container and a second heat exchanger located outside the first container, the first heat exchanger thermally coupled with the adsorbent; and
exchanging heat between the first fluid and a second fluid by circulating the second fluid through a coolant circuit including the second heat exchanger.

2. The method of claim 1, where circulating the second fluid through the coolant circuit further includes circulating the second fluid through a cooling jacket of a vehicle engine.

3. The method of claim 2, further comprising:
allowing the vehicle engine to reach a predetermined running temperature; and then
stopping circulation of the first fluid in the coolant/adsorber heat exchange loop.

4. The method of claim 3, further comprising:
circulating a third fluid in a heat recovery loop through a third heat exchanger located within the first container and a fourth heat exchanger located outside the first container and thermally coupled to a waste heat source;
activating a fan coupled to the second container;
allowing the adsorbate in the second container to reach a predetermined threshold level;
closing the first valve;
stopping circulation of the third fluid; and
de-activating the fan coupled to the second container.

5. The method of claim 4, where the waste heat source is an exhaust passage coupled to the vehicle engine.

6. The method of claim 2, where circulating the second fluid through the coolant circuit further includes circulating the second fluid through a radiator and a third container, where the third container is a reservoir containing the second fluid.

7. The method of claim 6, where circulating the second fluid through the coolant circuit further includes circulating the second fluid through a heating circuit of the coolant circuit, the heating circuit including a heater core used for warming a passenger cabin of the vehicle.

8. The method of claim 1, where the adsorbent is zeolite and the adsorbate is an aqueous solution.

9. A thermal management system for a vehicle, comprising:
an adsorption thermal storage device comprising a first container including an adsorbent coupled via a first valve to a second container including an adsorbate;
a coolant/adsorber heat exchange loop in which a first coolant circulates, the coolant/adsorber heat exchange loop including a first heat exchanger located within the first container and a second heat exchanger located outside the first container, the first heat exchanger thermally coupled with the adsorbent; and
a coolant circuit in which a second coolant circulates, the coolant circuit including the second heat exchanger and a first warming target.

10. The system of claim 9, further comprising:
a heat recovery loop in which a third coolant circulates, the heat recovery loop including a third heat exchanger located within the first container and a fourth heat exchanger located outside of the first container, the fourth heat exchanger thermally coupled with a waste heat source.

11. The system of claim 10, where the coolant circuit further includes a second warming target and a third container, wherein the third container is a reservoir containing the second coolant.

12. The system of claim 11, further comprising:
a heating circuit, the heating circuit including a second valve and a third warming target, wherein the heating circuit is included in the coolant circuit when the second valve is open.

13. The system of claim 12, further comprising:
a controller configured with instructions stored in memory for: in response to a request for heat for the first warming target, opening the first valve, circulating the first coolant through the coolant/adsorber heat exchange loop and circulating the second coolant through the coolant circuit.

14. The system of claim 13, where the controller is further configured with instructions stored in memory for: in response to a request for heat for the third warming target, opening the second valve, circulating the second coolant through the heating circuit, and activating a first fan coupled to the third warming target.

15. The system of claim 13, where the controller is further configured with instructions stored in memory for: in response to a level of adsorbate in the second container being below a first threshold, stopping circulation of the first coolant through the coolant/adsorber heat exchange loop, opening the first valve, circulating the third coolant through the heat recovery loop, activating a second fan coupled to the second container, allowing the level of adsorbate in the second container to reach a second threshold higher than the first threshold, closing the first valve and de-activating the second fan and stopping circulation of the third coolant through the heat recovery loop.

16. The system of claim 14, where the first warming target is a cooling jacket of a vehicle engine, the second warming target is a radiator and the third warming target is a heater core used for warming a passenger cabin of the vehicle.

17. The system of claim 10, where the waste heat source is an exhaust passage coupled to a vehicle engine, and the third coolant is a high temperature heat transfer fluid.

18. The system of claim 9, where the first warming target is a heater core used for warming a passenger cabin of the vehicle.

19. A warm-up system for a vehicle engine, comprising:
an adsorption thermal storage device comprising an adsorber containing an adsorbent coupled via a valve to a fluid tank containing an adsorbate;
a coolant/adsorber heat exchange loop containing a first coolant, the coolant/adsorber heat exchange loop including a first heat exchanger located within the adsorber and a second heat exchanger located outside the adsorber;

a coolant circuit containing a second coolant, the coolant circuit including the second heat exchanger and further including a cooling jacket of the vehicle engine; and a controller configured with instructions stored in memory for: in response to a cold start event, opening the first valve, circulating the first coolant through the coolant/adsorber heat exchange loop, and circulating the second coolant through the coolant circuit.

\* \* \* \* \*